(12) United States Patent
Cretors et al.

(10) Patent No.: US 6,872,923 B2
(45) Date of Patent: Mar. 29, 2005

(54) ONE POP POPCORN POPPER

(75) Inventors: Charles D. Cretors, Lake Forest, IL (US); Gilbert J. Evers, Lansing, IL (US); Nenad Vidojevic, Chesterton, IN (US)

(73) Assignee: C. Cretors & Company, Chicago, IL (US)

( * ) Notice: Subject to any disclaimer, the term of this patent is extended or adjusted under 35 U.S.C. 154(b) by 0 days.

(21) Appl. No.: 10/453,428

(22) Filed: Jun. 3, 2003

(65) Prior Publication Data

US 2004/0245240 A1 Dec. 9, 2004

(51) Int. Cl.[7] .............................................. H05B 1/02
(52) U.S. Cl. ...................... 219/494; 219/506; 219/519; 219/508; 99/323.7; 99/330; 426/438; 426/523
(58) Field of Search ................................ 219/494, 497, 219/501, 506, 519, 508; 99/323.7, 323.5, 323.6, 323.8, 323.9, 330, 331, 486; 426/233, 523, 438, 450

(56) References Cited

U.S. PATENT DOCUMENTS 3,554,115 A * 1/1971 Manley et al. ............. 99/323.7
5,301,601 A * 4/1994 Cretors ...................... 99/323.5
5,662,024 A * 9/1997 Cretors et al. ............. 99/323.7
6,534,103 B2 * 3/2003 Weiss ......................... 426/233
6,672,201 B2 * 1/2004 Evans et al. ................ 99/323.7
2003/0159591 A1 * 8/2003 Evans et al. ................ 99/323.5

* cited by examiner

*Primary Examiner*—Mark Paschall
(74) *Attorney, Agent, or Firm*—Mayer, Brown, Rowe & Maw LLP

(57) ABSTRACT

A popcorn machine for automatic activation of the popping cycle is disclosed. The popcorn machine has a kettle with a heating element controlled by a thermostat. Popping corn is placed in the kettle by a user. A control panel has a one pop button which when pressed initiates the full popping cycle. The one pop button activates a relay that closes a connection through the thermostat to the heating element. The thermostat regulates the temperature in the kettle and shuts off power to the heating element by opening itself and unlatching the relay after a predetermined temperature is reached to allow the completion of the popping cycle. If the kettle initially is over the predetermined temperature, the thermostat will be open and the relay will be unlatched, preventing power from flowing to the heating element. A timer relay may be connected to the first relay to allow the activation of the heating element during a set period of time allowing the kettle to cool. The kettle may also be connected to an oil pump. The activation button also activates the oil pump to pump oil into the kettle at the initiation of the popping cycle.

20 Claims, 5 Drawing Sheets

ONE POP POPCORN POPPER

FIELD OF INVENTION

This invention relates to machines used for preparing popcorn and more specifically, to a popcorn machine that uses a control circuit that activates the popping sequence at specific kettle temperatures.

BACKGROUND OF INVENTION

Popcorn popping machines for concession stand, restaurant or home use are well known. Generally, such popping machines have a cabinet or case in which the popcorn is both cooked and stored. Unpopped corn (kernels) is typically loaded into a kettle suspended from the top of the popcorn case, combined with cooking oil, and heated. The kettle has electrical heating elements to heat the oil and corn kernels and thereby effect popping of the kernels. As the popcorn fills the kettle, an initial portion of the popcorn discharges into the popcorn case and the remainder is subsequently dumped out of the kettle. A thermostat in the kettle is coupled to the heating elements to insure proper popping time and prevent the kettle from overheating. An exhaust blower is used to vent the interior of the case. The oil is typically stored in a solid form and liquefied by a heating element just before the oil is needed.

The thermostat is typically set to a temperature that will turn off the heat 15–20 seconds before the corn finishes popping. After the contents of the kettle are dumped, new corn, salt and oil are added to the kettle. When the new popping components are added, the temperature of the kettle decreases causing the thermostat to close, powering the heating element and then heating the kettle.

In popcorn machines known presently, the various parts of the machine such as oil injection, kettle heating and exhaust systems are activated manually. Thus, the user must correctly add popcorn, salt and oil, activate the kettle heat, and turn off the kettle heat when finished. The user must also monitor the popping operation to insure that all the steps are followed in the proper sequence. As popcorn machines are used in concession venues, such tasks unnecessarily occupy an employee who could be performing other tasks such as servicing customers.

Further, after the popping cycle a user may neglect to turn off the power, thus causing the kettle to heat. Previously, thermostats have been used to control kettle heat at an operating temperature of around 500 degrees F. and to prevent the cooking kettle from reaching unacceptably high temperatures to assist a user. However, such devices do not entirely eliminate the need for a user to monitor the entire popping process. The use of manual control of popping operations results in increased energy consumption and may create safety issues. In addition, the unnecessary use of the mechanical and electrical components due to inefficient use may contribute to premature parts wear.

Thus, there is a need for an automated popcorn machine that controls the popping operation leaving a user to perform other tasks and increases user safety. There is also a need for an automated popcorn machine that may be activated with a single control. There is yet another need for an automated popping controller which will reduce energy consumption and extend part lifetime.

SUMMARY OF THE INVENTION

These needs and others may be met by the present invention that includes a popping control for controlling kettle heat for a popcorn popper. The control circuit includes a kettle and a heating element in the kettle. An activation button is coupled to a relay and the relay is coupled to a power source to provide power to the heating element. A heat detection circuit located in the kettle is coupled to the relay. When the activation button is activated power is provided to the relay and activates the heating element. The heating circuit opens when a selected temperature is reached opening the relay and preventing power from flowing to the heating element.

Another example of the present invention may be found in a popcorn popper that allows a popping cycle to be initiated automatically below a selected kettle temperature. The popper has a kettle, a heating element in the kettle and a thermostat circuit having a set temperature point located in the kettle. An activation button is provided. A relay is coupled to the heating element, the thermostat circuit and the activation button, the relay controls a power source to provide power to the heating element. When the activation button is pressed, it closes the first relay that provides power from the power source to the heat element if the kettle temperature is below the set temperature point. The thermostat circuit opens the relay when the set temperature point is reached.

Another example of the present invention may be found in a popcorn machine for the automatic activation of a popping cycle. The popcorn machine includes a kettle, a power cord and a heating element within the kettle, the heating element coupled to the power cord via a heating relay. A pump circuit is coupled to an oil pump, the oil pump supplying oil to the kettle and having a pump relay coupled to the power cord. An activation button is provided and a first relay is coupled to the activation button. A timer relay is coupled to the first relay. When the activation button is pressed, the first relay activates the timer relay causing the heating relay to be activated after a set time interval. A thermostat is coupled between the heating relay and the power source and coupled to the first relay. The thermostat opens the first relay after the heating element reaches a certain temperature.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

These and further aspects and advantages of the invention will be discussed more in detail hereinafter with reference to the disclosure of preferred embodiments, and in particular with reference to the appended Figures wherein.

DESCRIPTION OF THE PREFERRED EMBODIMENT

Figure 1:
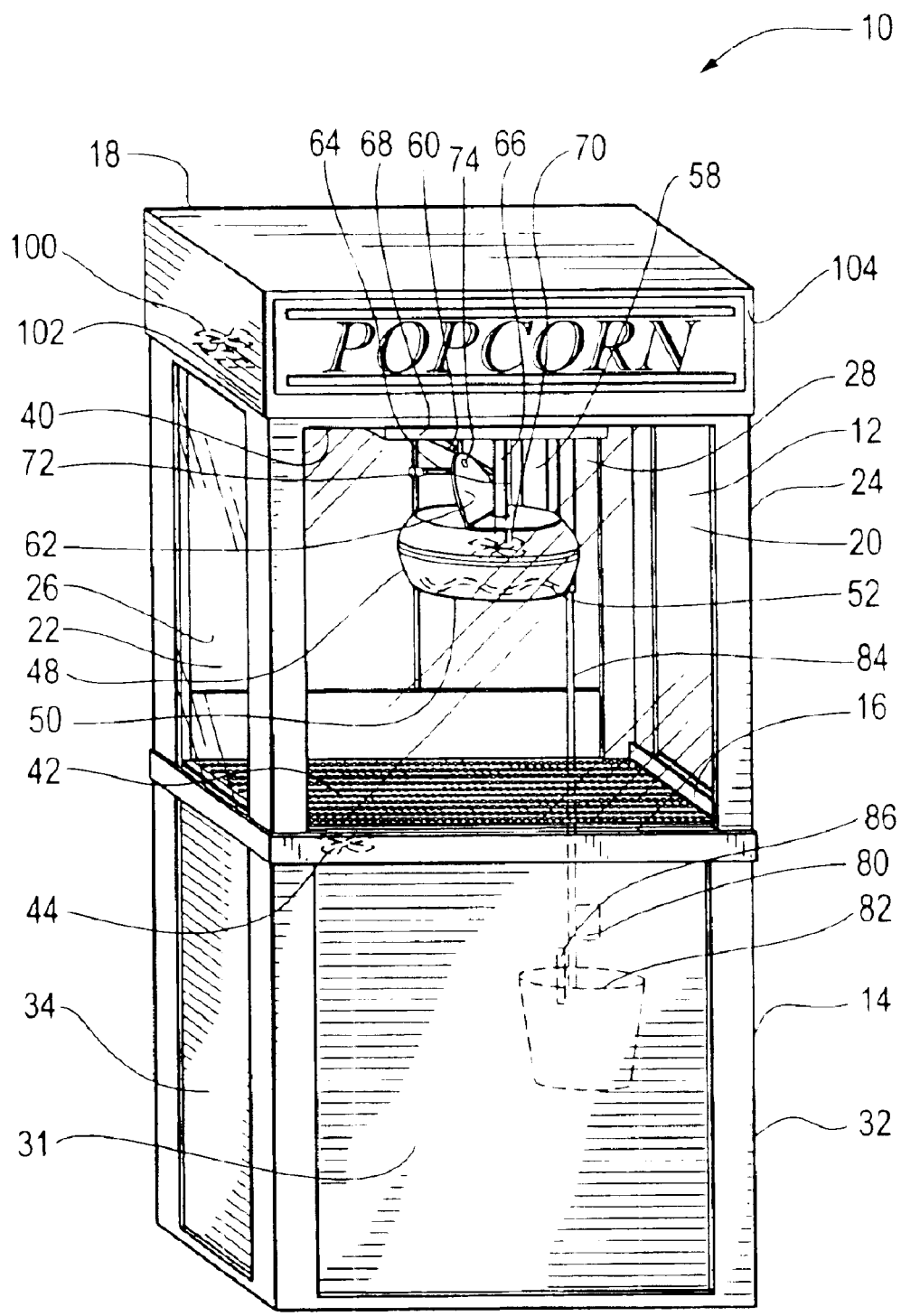
FIG. 1 is a front perspective view of the popper incorporating the one pop control of the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Figure 2:
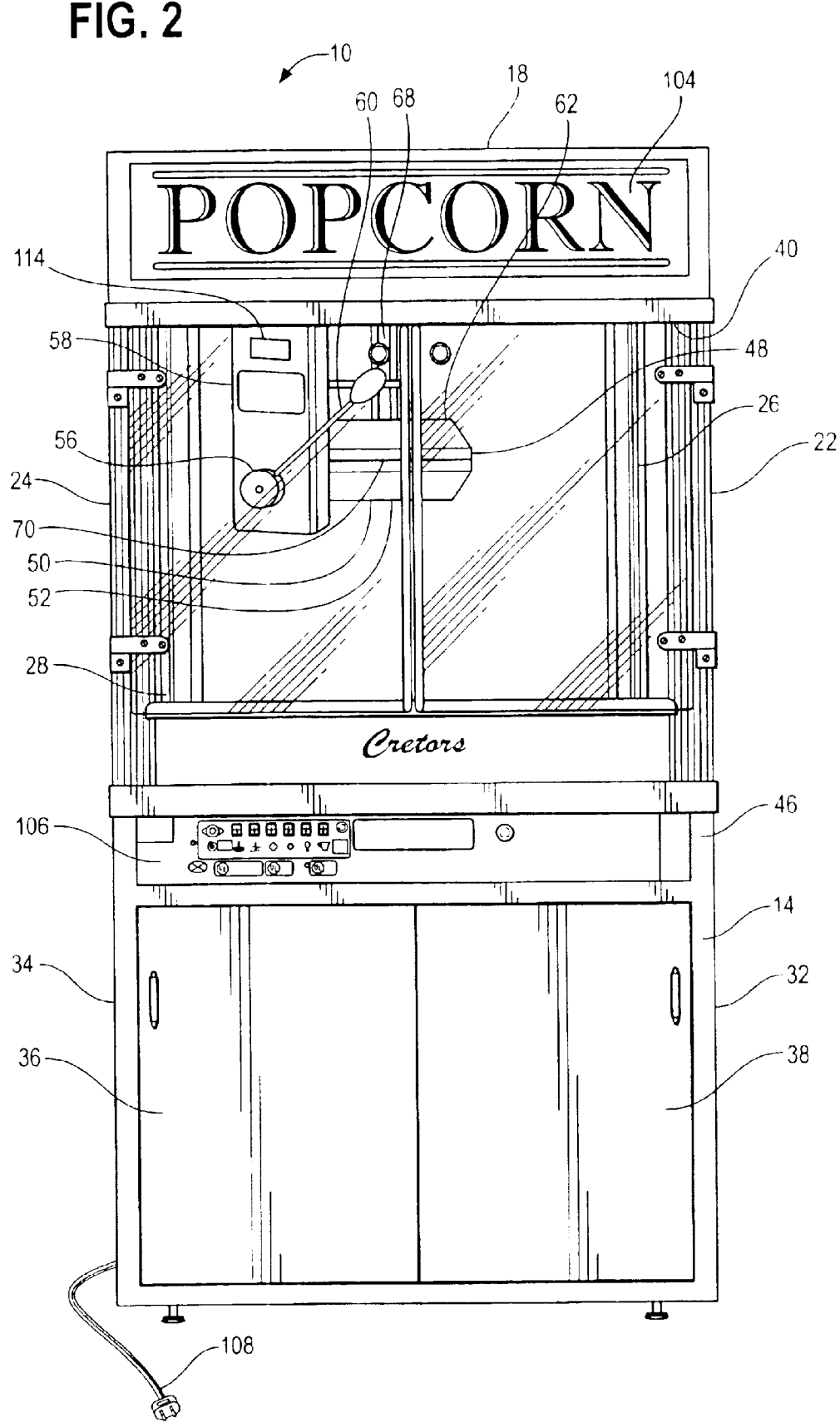
FIG. 2 is a rear view of the popper in FIG. 1.

FIGS. 1 and FIG. 2 show front and rear views of a popcorn making machine 10 which incorporates a one touch automatic control system according to the present invention. The popcorn machine 10 is a stand alone unit which is used for the intermittent to continuous production of popcorn. The popcorn machine 10 includes a popcorn case or cabinet 12 within which popcorn is both produced and stored. The popcorn machine 10 also includes a storage section 14 which may be used to store supplies such as extra popping kernels, oil, containers and the like.

The popcorn case 12 has a flat bottom shelf 16, a flat top wall 18 and is enclosed by a front panel 20 and a pair of side walls 22 and 24. The front panel 20 and the side walls 22 and 24 are typically made of tempered glass, plexiglass or other clear material to allow viewing of the popping process, as well as the completed popcorn which is stored in the popcorn case 12. Access to the popcorn case 12 is provided by means of a pair of hinged rear doors 26 and 28, which are also made of plexiglass, to permit the operator to carry out cooking operations and to dispense popcorn when desired.

The storage section 14 has a front panel 31 and a pair of side walls 32 and 34. As shown in FIG. 2, a pair of sliding doors 36 and 38 provides access to both the storage space and the electrical and mechanical components of the machine 10.

The popcorn case 12 has a heating lamp 40 that is mounted on the top of popcorn case 12 to keep popped corn warm. In addition, a heating pad 42 is mounted under on the bottom shelf 16 and between the popcorn case 12 and the storage section 14 to assist in keeping popped corn in the popcorn case 12 warm. A blower 44 allows the warm air generated by the heating pad 42 to be circulated throughout the popcorn case 12. A control unit 46 is also mounted under the bottom shelf 16 and between the popcorn case 12 and the doors 36 and 38 of the storage section 14.

A suitable amount of popcorn kernels are placed into a kettle 48 that is suspended from the top wall 18 of case 12. The kettle 48 may be mounted within the popcorn case 12 by other structures such as a pedestal from the base. The kettle 48 is constructed of stainless steel, steel or aluminum and may be plated with chromium or nickel and has heating elements 50 located in its walls. The heating elements 50, when activated, are utilized to heat oil injected into the kettle 48 and to pop the kernels of corn placed into the kettle 48 by the operator. A thermostat circuit 52 is located on the kettle 48 to sense the temperature of the kettle 48. The thermostat circuit 52 is connected to the control unit 46.

The kettle 48 is supported on a pivot axis 56 carried within support column 58 extending from the top wall 18 of the popcorn case 12. A kettle dump handle 60 is connected to the pivot axis 56 of the kettle 48 so that by rotating the dump handle 60, the kettle 48 may be tipped on the pivot axis 56 to allow popped popcorn to be discharged from kettle 48 into popcorn case 12.

The kettle 48 has a cover 62 that is circular in shape and is suspended by means of a support rod 64 that is extended through the center of the cover 62. The support rod 64 encloses a drive shaft 66 which is connected to a motor 68 on one end and is connected at the other end to an agitator 70 having a number of mixing blades. The agitator 70 is rotated by the motor 68 to agitate the kernels in the kettle 48.

The kettle cover 62 is hinged and may be opened via a cover lift rod 72 to add kernels. The cover 62 may have a magnet 74 which may be used to hold the cover 62 in an open position to assist in the addition of kernels.

An oil pump 80 is operably positioned in an oil container 82 that is located within the storage section 14. The oil container 82 is a pail in this example but may also be a container which a bag of oil in a corrugated cardboard container for easy replenishment of oil. The oil pump 80 draws oil from the oil container 82 through a tube 84 that allows the oil to flow into the kettle 48. Typically, the oil is initially in solid form in container 82 and is liquefied by a heating element 86 that is inserted into the solid oil to melt the solid oil. After the oil is liquefied, the heating element 86 is operated for about 30 minutes prior to initiation of popping operations, the oil pump 80 is inserted into the oil container 72 and can then be used to inject oil into the kettle 48 via the tube 84, as desired. When the oil has been completely consumed, the entire oil container 72 may be replaced by a new container of oil. Salt and sugar may be added manually to the kettle 48 by the operator during the popping operation depending on the flavoring desired and the setting of the popcorn machine 10.

An exhaust blower 100 is mounted on the top wall 18 of the popcorn case 12 for venting the interior thereof. A charcoal filter 102 is included as part of the exhaust blower 100 that serves to vent the popcorn case 12. Thus any undesirable odors may be reduced and airborne oils eliminated from the area around the popcorn machine. The exhaust blower 102 is coupled to and controlled by control unit 46. A series of lights 104 are mounted in the top wall 18 to illuminate the popcorn case 12. A power cord 108 is connected to the control unit 46 to provide the popcorn machine 12 with the necessary electrical power to operate the various components. The power cord 108 is a conventional three line power line which may be plugged into a normal 120 or 208 volt power source.

Figure 3:
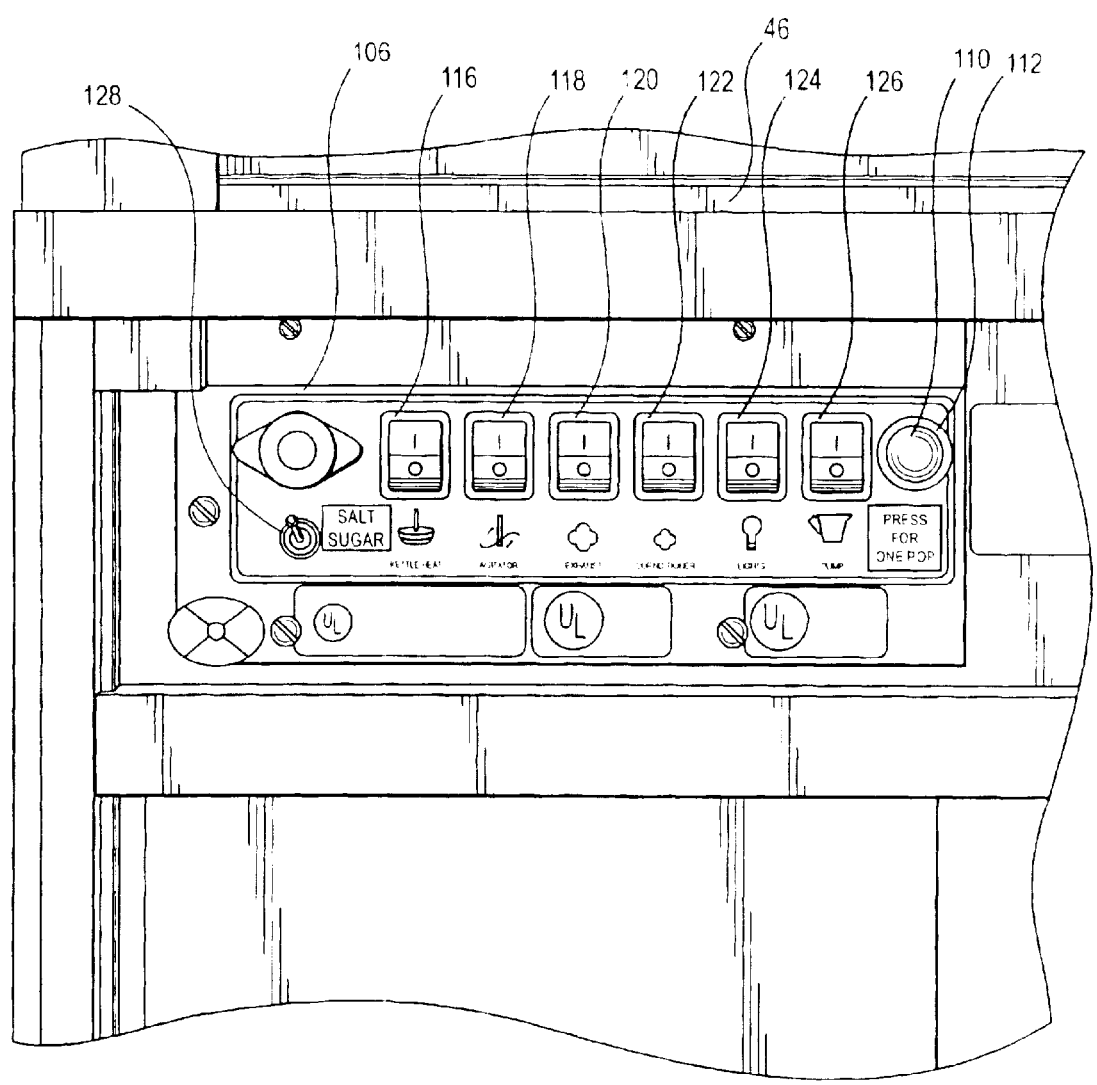
FIG. 3 is a close up view of the control panel of the popper in FIG. 1.
Figure 5:
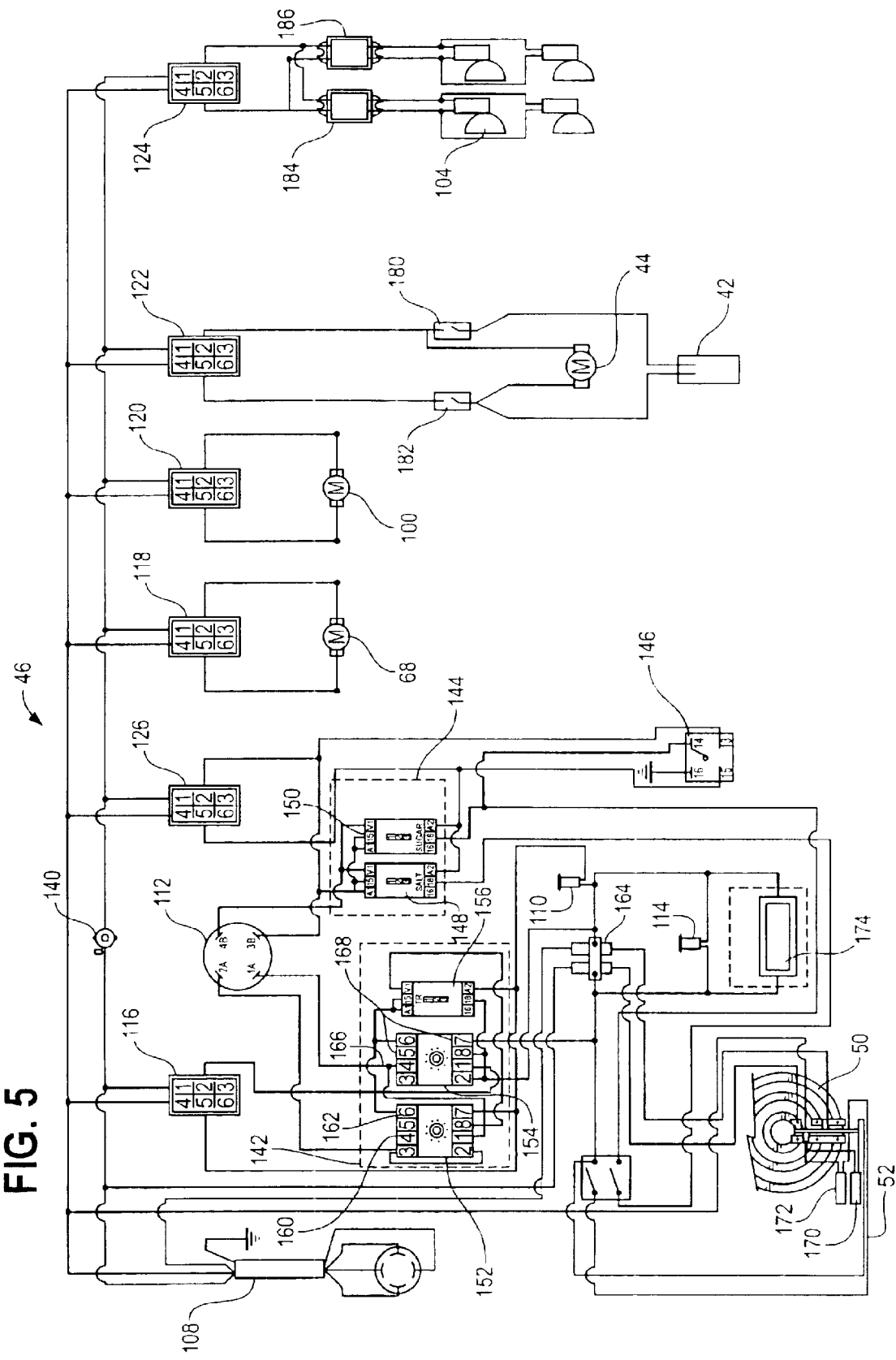
FIG. 5 is a detailed circuit diagram of the elements of the popper in FIG. 1.

The user may initiate the operation of the popcorn machine 12 via a control panel 106 that is mounted on the back of the storage section 14 of the case 12. FIG. 3 is a close up of the control panel 106. The control panel 106 has a green one pop indicator light 110 that is contained on a one pop button 112. As will be explained, a user may press the one pop button 112 to automatically begin the popping cycle. The green indicator light 110 will light to indicate that the one pop button 112 has been pressed. An amber light 114 is installed on the support column 58 as shown in FIG. 1 and lights to indicate that the kettle 48 is heating. The control panel 106 also has a kettle heat switch 116, an agitator switch 118, an exhaust switch 120, a conditioner switch 122, a lamp switch 124 and an oil pump switch 126. A salt/sugar switch 128 is also installed on the control panel 106. All of the machine elements described above are operatively interconnected and functionally controlled by the control unit 46 as shown in FIG. 5. The control unit 46 is activated by the control panel 106 and the button 112 is lit during the time in which each operation is functioning.

Figure 4:
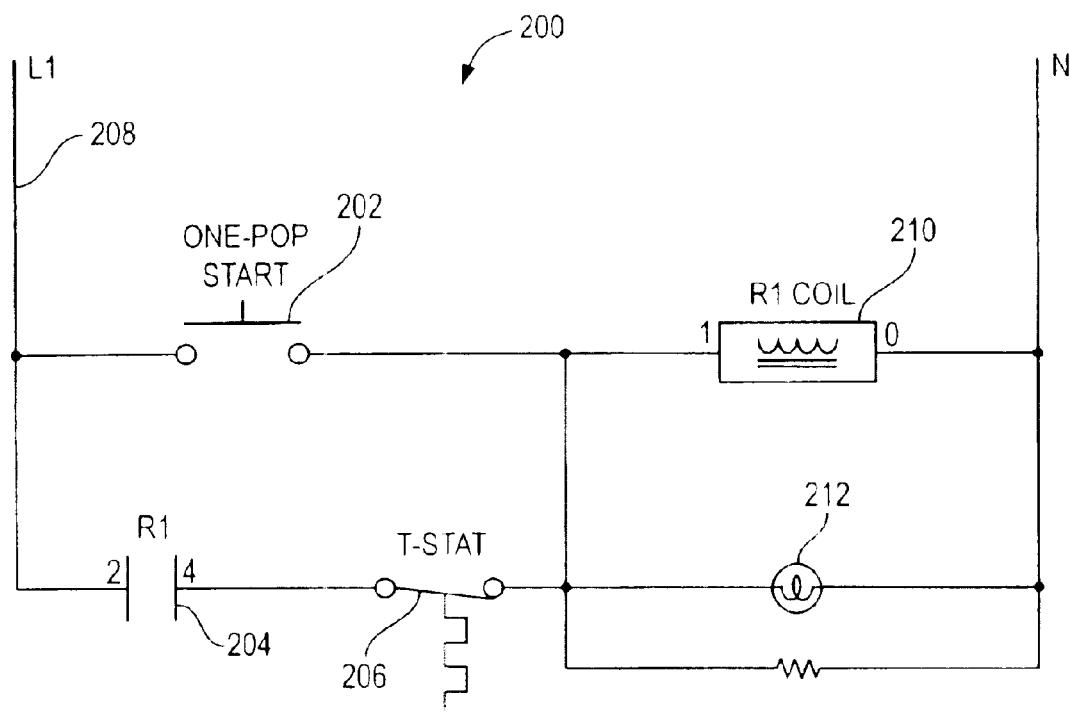
FIG. 4 is a circuit diagram of the one pop control.

FIG. 4 is a circuit diagram of a kettle heat control circuit 200 which may be used in any popcorn popper such as the popper in FIG. 1 to control the popping operation. The heat control circuit 200 allows the regulation of heat in the kettle but prevents heating the kettle when the kettle is already over a specific temperature. The kettle heat control circuit 200 has a start switch 202 which may be an activation button or similar mechanism. The start switch 202 is coupled in parallel to a relay 204 and a heat detection circuit such as a thermostat 206. These components are coupled to a power source 208 and through a heating element such as a heating coil 210 that is installed in the kettle. To prevent excessive heating of the kettle, the relay 204 is latched by the thermostat 206. An indicator light 212 is wired in parallel with the heating coil 210 to indicate that power is flowing to the heating coil 210.

The relay 204 is closed by pressing the start switch 202. If the kettle is below a specific temperature for popping, the thermostat 206 will be closed and therefore the relay 204 will remain latched on closing the circuit to power the heating coil 210. The power is maintained to the heating coil 210 until the kettle reaches the temperature point of the thermostat 206. The thermostat 206 is then opened, breaking the circuit and preventing power from flowing to the heating coil 210 and opening the relay 204.

If the kettle heat exceeds the temperature point of the thermostat 206 when the starter button 202 is pressed, the thermostat 206 is open, the relay 204 cannot latch on and remains off preventing power to the heating coil 210. Once the kettle has cooled down, the thermostat 206 will close thus latching the relay 204 on and providing power to the heating coil 210. The temperature of the thermostat 206 is selected to provide proper popping of corn in the kettle. In this manner, the kettle will not be heated until a cooling period has passed, thus decreasing the danger of excessive kettle heat.

The circuit 200 in FIG. 4 may be integrated with other components to provide more control of the popping operations. Referring to FIG. 5, there is shown a circuit diagram of the control unit 46 that allows the one touch activation of the popping process above a selected kettle temperature according to the present invention. The control unit 46 includes the kettle switch 116, the agitator switch 118, the exhaust switch 120, the conditioner switch 122, the lamp switch 124 and the pump switch 126. The switches 116–126 are powered through the power cord 108 and provide a power connection to the various components. A fuse 140 is installed on the power line from the power cord 108 that prevents electrical overloads to the various components. The control unit 46 includes a one pop control circuit 142 that controls the power to the heating elements 50 in the kettle 48 and other components that will be described below for the popping cycle. The kettle switch 116 is coupled to the heating elements 50 and the thermostat circuit 52 in the kettle 38.

The pump switch 126 is coupled to a pump circuit 144 that includes a pump plug 146 that in turn supplies power to the pump 80. The user activates power to the pump 80 and the pump circuit 144 by turning on the pump switch 126. The pump switch 126 is also coupled to a salt timer 148 and a sugar timer 150 that control the length of time the pump 80 is activated depending on whether salt or sugar was added to the kettle 48. The pump switch 126 provides power to the salt timer 148 and sugar timer 150 which in turn supply power to the pump plug 146 that activates the pump 80 to add oil to the kettle 48 for a set amount of time. The salt timer 148 and sugar timer 150 are coupled to the one pop button 112 that activates the pump circuit 144. The amount of time set in the timer 148 or 150 provides sufficient oil for popping one batch of either salted corn or sugar corn in the kettle 48.

The one pop circuit 142 is activated by pushing the one pop button 112. The one pop circuit 142 has a first control relay circuit 152 and a second control relay circuit 154. The one pop circuit 142 also includes a timer relay 156. The activation of the start button 112 causes the popping sequence to be initiated by the pump circuit 144, the control relays 152 and 154 and the timer relay 156.

The first control relay circuit 152 has a first relay 160 that is tied in parallel to the one pop button 112. The first control relay circuit 152 also has a second relay 162 that is coupled to the timer relay 156. When the one pop button 112 is activated, power is provided to the first relay circuit 152. The first relay 160 is closed to latch power to the first relay circuit 152. The second relay 162 is also closed to apply power to close the timer relay 156. The closed timer relay 156 also provides power to the one pop indicator light 110.

Assuming that the thermostat circuit 52 is closed, power is supplied to the second control relay circuit 154 and a heat relay 164. The second control relay circuit 154 has a first relay 166 that is coupled between the power switch 116 and the first relay circuit 152 and a second relay 168 that is coupled to the heat relay 164. The heat relay 164 is in turn coupled to the kettle switch 116 that provides power to the heating elements 50 when the heat relay 164 is closed. The heat relay 164 is also turn coupled to the thermostat circuit 52 that functions as a heat detection circuit. The thermostat circuit 52 includes a low temperature thermostat 170 and a high temperature thermostat 172. The salt/sugar switch 128 is coupled between the heating relay 164 and the low temperature thermostat 170 and the high temperature thermostat 172, allowing selection of one of the thermostats 170 and 172 to be connected to the heating relay 164. The thermostat 170 may thus be selected to allow a low temperature such as 380 degrees F. for sugar corn or the thermostat 172 may be selected for a higher temperature such as 410 degrees F. for salted corn.

The heat relay 164 is coupled in parallel to the amber heat light 114 and is also in parallel with an optional counter 174. The heat light 114 is thus powered when the heat relay 164 is activated indicating that power is connected to the heating elements 50. The counter 174 is preferably a Newark model 99F625 counter although other counting mechanisms may be used. The counter 174 increments when the second control relay circuit 154 is activated and tracks the number of times the popping cycle is activated.

The operation of the popping cycle is automated in one cycle. Once the one pop button 112 is pushed, the first and second relays 160 and 162 of the first relay circuit 152 are closed. The one pop button 112 activates the pump circuit 144 causing oil to be pumped into the kettle 48 for the period of time set by the timers 148 or 150. Power is supplied to the green light 110 indicating to the user that the one pop cycle has been initiated.

The first relay 166 of the second relay circuit 154 is normally closed, but is denergized and will open to remove power from the first relay circuit 152. The second relay 162 of the first relay circuit 152 will thus open and stop power to the timer relay 156 which starts a timing delay. The timer relay 156 activates the second control relay circuit 154 after a delay period of time such as 7 seconds or another appropriate time to allow the second relay 168 to be closed. After a set amount of time the timer relay 156 is turned off which causes the second relay 168 of the second relay circuit 154 to connect power to the heat relay 164. The thermostat 170 or 172 should be closed because the temperature of the kettle is not at the temperature threshold points of the thermostat 170 or 172. The threshold temperature of the kettle heat for popping is determined by the thermostat 170 or 172 that is selected by the salt/sugar switch 128. When the thermostat 170 or 172 is closed, power continues to be supplied via the second relay 168 to the heat relay 164. The amber light 114 is turned on since it is in parallel to the heat relay 164 indicating the kettle 48 is being heated. When the thermostat 170 or 172 senses the kettle 48 has reached a sufficient temperature to pop the corn and finish the popping cycle, it will open, thus interrupting power to the second relay 168 which in turn interrupts power to the heat relay 164 and cuts off power to the heating elements 50. The one pop light 110 and the heat light 114 are also turned off as they are in parallel with the heat relay 164. The kettle 48 will then cool down and the cycle will be completed until the one pop button 112 is pressed again. The optimal temperature for both a low temperature for sugar corn and a high temperature for salted corn may be changed by selecting the appropriate settings on thermostats 170 and 172.

If the kettle temperature is over the temperature set by the selected thermostat 170 or 172 at the initiation of the start button 112, the one pop circuit 142 will still begin to operate causing the second relay 168 to cause power to be connected to one side of the heat relay 164 and thus the heating elements 50 and heat indicator light 114. However, these components will remain off because the thermostat 170 or 172 will be open. When the kettle 48 cools down below the set temperature, the thermostat 170 or 172 will close, and the popping cycle will begin since the circuit will be closed with respect to the heat relay 164. The one pop light 110 remains on since it is powered when the second relay 168 is closed.

The agitator switch 118 is coupled to the agitator motor 68 and allows a user to activate power to the agitator motor 68 to cause the agitator 70 to rotate and stir the corn in kettle 48 during the popping process for better distribution of corn, oil and salt or sugar. The exhaust switch 120 is coupled to the exhaust blower 100 and activating this switch will cause power to be supplied to the exhaust blower 100 to ventilate the popcorn case 12. The conditioner switch 122 is coupled in a series circuit to a thermostat 180, the blower 44, and a high limit circuit 182. The heating pad 42 is coupled in parallel to the blower 44. The thermostat 180 will interrupt power to the heating pad 42, if the temperature exceeds a certain limit. The high limit circuit 182 will interrupt power to both the blower 44 and the heating pad 42 if the thermostat 180 fails to close at the appropriate temperature. The lamp switch 124 is coupled to two transformers 184 and 186 that in turn power the lights 104. The lights 104 are preferably halogen lamps for maximum lighting, however other types of lamps such as fluorescent lamps may be used.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A popping control for controlling kettle heat for a popcorn popper, the control circuit comprising:
    a kettle;
    a heating element in the kettle;
    an activation button coupled to a relay, the relay coupled to a power source to provide power to the heating element;
    a heat detection circuit located in the kettle, the heat detection circuit coupled to the relay to open the relay at a selected temperature, the selected temperature sufficient to allow the kettle to cook popcorn; and
    wherein when the activation button is pressed, the relay is closed and remains closed to connect power to activate the heating element and cook popcorn in the kettle, and wherein the heat detection circuit opens when the selected temperature is reached opening the relay and preventing power from flowing to the heating element until the activation button is pushed again.

2. The popping control of claim 1 further comprising a timer relay coupled to the activation button and the relay, which allows the relay to be closed in a set period of time.

3. The popping control of claim 1 wherein the heating circuit includes a heating relay coupled to a heating coil.

4. The popping control of claim 1 wherein the heating circuit includes a thermostat.

5. The popping control of claim 1 wherein the heat detection circuit further includes a high temperature thermostat, a low temperature thermostat, and a selector switch coupled to the thermostats to allow selection of either thermostat.

6. The popping control of claim 1 further comprising:
    an oil pump having a tube allowing oil to flow to the kettle; and
    an oil pump relay timer coupled to the relay, wherein when the relay is closed, the oil pump relay timer operates oil pump for a selected period of time.

7. The popping control of claim 1 wherein the relay remains open above the selected temperature regardless of whether the activation button is pressed.

8. A popcorn popper which allows a popping cycle to be initiated automatically below a selected kettle temperature, the popper comprising:
    a kettle;
    a heating element in the kettle;
    a thermostat circuit having a set temperature point located in the kettle, the set temperature sufficient to allow the kettle to cook popcorn;
    an activation button;
    a relay coupled to the heating element, the thermostat circuit and the activation button, the relay controlling a power source to provide power to the heating element; and
    wherein pressing the activation button closes the relay which remains closed and provides power from the power source to the heat element if the kettle temperature is below the set temperature point and cook popcorn in the kettle and wherein the thermostat circuit opens the relay when the set temperature point is reached and prevents power to the heating element until the activation button is pressed again.

9. The popcorn machine of claim 8 wherein the thermostat circuit further includes a selector switch coupled to a high temperature thermostat and a low temperature, the selector switch connecting either thermostat to the relay.

10. The popcorn machine of claim 8 wherein the kettle is suspended from the top of a popcorn case.

11. The popcorn machine of claim 8 wherein the popcorn kettle is supported from a pedestal in a popcorn case.

12. The popcorn machine of claim 8 further comprising a motor, an agitator suspended in the kettle and powered by the motor.

13. The popcorn machine of claim 8 further comprising a first heat light coupled to the thermostat circuit to indicate that the heating element is connected to power and a second activation light coupled to the relay to indicate that the activation button has been pushed.

14. The popcorn machine of claim 8 further comprising a heating pad in the popcorn case and a blower in the popcorn case.

15. The popcorn machine of claim 8 further comprising a counter coupled to the relay which increments when the activation button is pressed.

16. The popcorn machine of claim 8 wherein the relay remains open above the selected temperature regardless of whether the activation button is pressed.

17. A popcorn machine for the automatic activation of a popping cycle, the popcorn machine comprising:
- a kettle;
- a power cord;
- a heating element within the kettle, the heating element coupled to the power cord via a heating relay;
- a pump circuit coupled to an oil pump, the oil pump supplying oil to the kettle and having a pump relay coupled to the power cord;
- an activation button;
- a first relay coupled to the activation button;
- a timer relay coupled to the first relay, wherein when the activation button is pressed, the first relay is closed and remains closed to close the timer relay causing the heating relay to be activated within a set time interval;
- a thermostat coupled between the heating relay and the power source and coupled to the first relay, wherein the thermostat opens the first relay after the heating element reaches a certain temperature, sufficient to cook popcorn in the kettle, the relay staying open until the activation button is pressed again.

18. The popcorn machine of claim 17 further comprising a counter circuit coupled in parallel with the first relay which increments when the first relay is activated by the activation button.

19. The popcorn machine of claim 17 further comprising:
- a heat indicator light coupled in parallel to the heat relay; and
- a start indicator light coupled to the timer relay.

20. The popcorn machine of claim 17 further comprising:
- a second thermostat coupled to the heating element,
- a selection switch coupled to the first and second thermostat wherein the selection switch couples either of the thermostats to the first relay.

* * * * *